(12) United States Patent
Dorsch

(10) Patent No.: US 6,877,406 B2
(45) Date of Patent: Apr. 12, 2005

(54) CUTTING TOOL, IN PARTICULAR FOR MACHINING PISTON RINGS AND METHOD FOR MACHINING PISTON RINGS

(75) Inventor: Walter Dorsch, Unterleinleiter (DE)

(73) Assignee: Kennametal Inc., Latrobe, PA (US)

( * ) Notice: Subject to any disclaimer, the term of this patent is extended or adjusted under 35 U.S.C. 154(b) by 24 days.

(21) Appl. No.: 10/662,045

(22) Filed: Sep. 12, 2003

(65) Prior Publication Data

US 2004/0123706 A1 Jul. 1, 2004

(30) Foreign Application Priority Data

Sep. 13, 2002 (DE) ..................... 202 14 238 U
Nov. 2, 2002 (DE) ..................... 202 16 864 U (51) Int. Cl.$^7$ ................................. B23B 3/00
(52) U.S. Cl. ..................... 82/1.11; 407/67; 407/69; 407/70; 407/103
(58) Field of Search ............... 82/1.11, 113; 407/67, 407/68, 69, 70, 103, 113, 71

(56) References Cited

U.S. PATENT DOCUMENTS

| | | | |
|---|---|---|---|
| 3,163,918 A | | 1/1965 | Emmons |
| 3,754,309 A | * | 8/1973 | Jones et al. ............... 407/77 |
| 4,018,112 A | * | 4/1977 | Heaton et al. ............. 82/1.11 |
| 4,035,887 A | * | 7/1977 | Hertel ...................... 407/120 |
| 4,174,916 A | * | 11/1979 | Kezran ...................... 407/70 |
| 4,557,639 A | * | 12/1985 | Fischer ..................... 407/20 |
| 4,669,924 A | * | 6/1987 | Benson ..................... 407/113 |
| 5,549,425 A | * | 8/1996 | Bernadic et al. ........... 407/114 |

FOREIGN PATENT DOCUMENTS

| | | |
|---|---|---|
| DE | 2363660 | 6/1975 |
| DE | 29804413 | 6/1998 |
| EP | 1033210 | 9/2000 |
| GB | 1430570 | 3/1976 |
| SU | 1537386 | 1/1990 |

* cited by examiner

Primary Examiner—Willmon Fridie, Jr.
(74) Attorney, Agent, or Firm—John J. Prizzi (57) ABSTRACT

Cutting tool (1) with a cutting insert (3), on the front edge (14) of which there is a first major cutting edge (15) and an approximately U-shaped indentation (18) that interrupts said first major cutting edge (15), whereby each side leg (19, 20) of the indentation (18) forms a minor cutting edge, and the base (21) of the indentation (18) forms a second major cutting edge (22) which is recessed in the feed direction (V) behind the first major cutting edge (15), and whereby the cutting insert (3) is formed by at least two separate sections (4a, 4b), each of which carries a portion of the indentation (18).

16 Claims, 5 Drawing Sheets

CUTTING TOOL, IN PARTICULAR FOR MACHINING PISTON RINGS AND METHOD FOR MACHINING PISTON RINGS

BACKGROUND OF THE INVENTION

1. Field of the Invention

This invention relates to a cutting tool which is provided in particular for the machining of piston rings.

2. Background Information

Piston rings are a mass-produced item used in internal combustion engines in the automobile industry, for example. The manufacture of piston rings, which is usually done using machining processes, is especially complicated to the extent that piston rings generally have a micro-structured surface on their outside periphery. For example, piston rings are frequently provided with a ring-shaped centering or spacer web, the axial dimension of which with respect to the axis of the piston ring is only a few millimeters. A precision external contour of this type is frequently produced by both an axial and radial movement of the cutting tool along the periphery of the piston ring. However, a process of that type is relatively time-consuming and can therefore be used only to a limited extent for mass production.

On one cutting tool described in U.S. Pat. No. 4,406,192 for the manufacture of a piston ring, the cutting tool is advanced in the axial direction along the periphery of an untrimmed blank, and thereby initially cuts only a half-contour in the grinding face of the untrimmed blank. To complete the piston ring, a second processing step is necessary, during which there the second grinding face of the untrimmed blank is machined.

OBJECT OF THE INVENTION

The object of the invention is a cutting tool that is particularly well suited for the manufacture of a precision external contour, in particular of a piston ring. The cutting tool must also be economical to manufacture and to operate.

SUMMARY OF THE INVENTION

The invention teaches that this object can be accomplished in a cutting tool as described herein below. Accordingly, the cutting tool comprises a cutting insert with a first major cutting edge located on its front edge, in which an approximately U-shaped indentation is made. The side legs of the indentation thereby each form a minor or secondary cutting edge. The base of the indentation forms a second major cutting edge which is recessed or offset behind the first major cutting edge in the feed direction. The cutting insert comprises at least two independent sections, each of which carries a part of the indentation and thus the corresponding cutting edges.

The teaching of the invention is that the manufacture of the external contour is significantly simplified by a tool that machines the external contour in a single cutting process along a feed path that is radial with respect to the axis of the workpiece. This simplified manufacturing process is made possible by a cutting insert that has a narrow indentation. However, it is very complicated to manufacture a cutting insert of this type in one piece, for one thing because the edges of the cutting insert that lie inside the indentation are either difficult or altogether impossible to reach with the grinding or sharpening tools, and therefore the creation of the cutting edges is extremely difficult. On the other hand, the invention teaches that the cutting insert can be manufactured without problems if the cutting insert is realized in a plurality of sections and the line that separates the adjacent sections of the cutting insert lies in the vicinity of the indentation. In this manner, each section of the cutting insert can be ground or sharpened separately, whereby unhindered access by the grinding or sharpening tool to each cutting edge is ensured. The indentation required to create the precision outside contour is therefore created only after the individual sections have been connected to one another.

An acute angle is preferably formed between the first major cutting edge and the adjacent side leg of the indentation, so that the clear width of the indentation increases toward the center of the cutting insert, and therefore opposite to the intended feed direction. This configuration guarantees sufficient freedom of access to the minor cutting edges that are located on the sides.

In addition, in at least one possible embodiment of the present invention, the increasing width of the indentation can compensate for possible thermal expansion of the workpiece, preferably a piston ring, during the cutting operation. To further explain, in one possible embodiment of the present invention, the cutting arrangement is first advanced toward the rotating workpiece. Initially, the major cutting edges positioned on either side of the indentation contact the workpiece and cut on either side of the workpiece, thus producing a centrally-positioned ring that projects radially about the perimeter of the workpiece. This projecting ring enters the indentation as the cutting arrangement is advanced toward the workpiece and the major cutting edges cut or grind off more material. The projecting ring, due to the heat produced by the friction of the cutting process, could begin to expand in width as it moves into the indentation. The angled design of the sides of the indentation can be used to compensate for this thermal expansion. As the projecting ring increases in size due to thermal expansion, the width of the indentation is also designed to increase in size to accommodate the expanding projecting ring. In this manner, the projecting ring could possibly be essentially prevented from becoming lodged in the indentation during the cutting operation. The amount of expansion would depend on the material being cut, the cutting speed, the size of the piston ring to be cut, etc.

On the other hand, for example, if the sides of the indentation were perpendicular to the major cutting edges, such as to form a rectangular or box shape, the expanding material could possibly be damaged by the indentation. As a result, the performance of the cutting arrangement could be affected negatively. The wear and tear on the cutting inserts could be significantly increased. In addition, more material could be removed from, the workpiece than would otherwise be desirable. It may even be possible that the projecting ring would become stuck to the point that removal from the indentation would be extremely difficult.

The first major cutting edge preferably forms a straight line. The invention further teaches that the second major cutting edge runs parallel to the first major cutting edge. This shape is particularly appropriate for the manufacture of a conventional piston ring, on the outside periphery of which there is a centering and spacer web that has a rectangular cross section. If necessary, the first and/or the second major cutting edge can be equivalently oriented at an angle to the feed direction. Furthermore, curved outside contours can also be produced by means of a curved first and/or second major cutting edge. Likewise, it is conceivable that a parallel offset arrangement of the front edges of the two sections could be used to create an outside contour with an asymmetrical step.

In one advantageous configuration, the lateral edges of each section are parallel to each other. The lateral edges of each individual section and the lateral edges of the different sections are therefore always oriented at the same angle with respect to the intended feed direction and can thus also be used as contact surfaces between adjacent parts. The lateral edges are preferably oriented at an angle with respect to the feed direction. A rear edge of each section that is approximately perpendicular to the feed direction makes it particularly easy to adjust the section in the tool holder. Furthermore, the rear edge acts as a large, stable stop to compensate for the forces that are exerted on the section during the feed of the workpiece. Theoretically, however, the lateral edges and the rear edge can have any desired shape. To achieve at least some of the advantages described above, all that is necessary is to guarantee that the sections can be placed in tight contact with one another and with the corresponding contact surfaces of the tool holder.

The cutting insert is preferably realized in two sections, whereby the line between the two sections runs so that one section carries one side leg of the indentation, while the second section carries the base and the other leg of the indentation. The advantage of this realization is among other things the fact that the two sections abut each other in a corner point of the U-shaped indentation that is subjected to hardly any mechanical stress during the cutting process, thereby preventing premature wear of the cutting edges at the joint. Furthermore, in this realization, it is particularly easy to grind the cutting edges.

In one particularly advantageous realization of the invention, the sections are identical, and thus have exactly the same area. In this realization, both cutting edges of each section are provided with a cutout or notch which forms the part of the U-shaped indentation that is complementary to the cutout or notch of the respective other lateral edge. By placing two such identical sections together, the indentation is automatically formed. The fact that the sections are identical simplifies the manufacture and use of the cutting insert, since only one single shape of section has to be manufactured and kept in inventory. An additional major advantage is that the sections are interchangeable in the manner of an disposable insert, whereby the cutting edges of the cutting insert that formerly lay on the lateral edge in turn form an identical U-shaped indentation with new, unused cutting edges.

A similar advantage is achieved by a centrically symmetrical configuration of the section with respect to the surface midpoint of the section. In this manner, each two diagonally opposite corners of each section have the same arrangement of cutting edges, so that when they are rotated by 180° around the surface midpoint in the manner of a disposable insert, a used cutting edge can be replaced by a new and identical cutting edge. If the sections, as preferred, are realized so that they have the same area and are centrically symmetrical, there are four possible identical arrangements of each two sections. It thereby becomes possible to make particularly efficient use of the cutting edge material.

A tool holder that is particularly well suited for use with the cutting insert taught by the invention comprises a support surface for the cutting insert and a rearward and a lateral stop which interact with the rear edge of the cutting insert or with one lateral edge of the cutting insert. The tool holder taught by the invention makes possible an easy assembly of the sections of the cutting insert and guarantees a high degree of stability. The sections of the cutting insert are either fixed to the tool holder by means of screws, or preferably by means of clamping brackets. As a result of the use of the clamping brackets, the sections of the cutting insert are advantageously pressed against the stops on the tool holder and are therefore automatically adjusted to the correct position. The clamping bracket or each individual clamping bracket can thereby be advantageously positioned so that the unused cutting edges of the respective cutting insert section are covered and thereby protected against damage caused by the material being removed.

According to one possible embodiment of the present invention, the cutting insert can be held or clamped or screwed into a tool holder device connected to a cutting arrangement. In one possible embodiment, the tool holder can be designed to be moved toward a workpiece to be cut. In one other possible embodiment, the cutting arrangement can be designed to be moved toward a workpiece to be cut. The workpiece is preferably a piston ring. The individual workpieces can be fed from a supply by a supply feed mechanism to an arrangement for receiving, holding, and rotating the workpieces. The holding arrangement can be designed to receive and hold individual or multiple workpieces. The workpiece can then be moved into a position adjacent the cutting arrangement. The workpiece can be positioned relative to the cutting arrangement such that the major cutting edges are essentially parallel to the center rotational axis of the workpiece. At or before the workpiece is in the position adjacent the cutting arrangement, a drive mechanism can be activated to rotate the holding arrangement, and thus the workpiece. As the workpiece is rotating, the cutting insert can be moved toward the workpiece along a line or path extending radially from the center rotational axis of the workpiece so the first major cutting edges engage the perimeter surface of the workpiece. The cutting insert can be moved back and forth along the radial path during the cutting process. As described above, the first major cutting edges are separated by an indentation or gap. This design permits the first major cutting edges to cut material from two sections of the perimeter of the workpiece, while the indentation permits a projecting ring to be formed on the perimeter surface of the workpiece. In other words, the first major cutting edges can initially cut off material on both sides of the workpiece to form the projecting ring. The cutting insert can then be advanced a predetermined distance until the second major cutting edge at the base of the indentation contacts the perimeter surface of the projecting ring and cuts some material from the surface of the projecting ring. To complete the cutting process, the cutting insert is moved back and out of engagement with the workpiece, during which movement the side legs or side walls of the indentation can perform a finishing cut on the sides of the projecting ring. The cutting insert is finally moved to its original starting position away from the completed piston ring. The workpiece holding arrangement can then release the completed piston ring directly into a storage area (not shown) or into an exit feed mechanism to convey the piston ring to a storage area (not shown).

One feature of an embodiment of the invention resides broadly in cutting tool 1 with a cutting insert 3, on the front edge 14 of which there is a first major cutting edge 15 and an approximately U-shaped indentation 18 which interrupts said first major cutting edge 15, whereby the side legs 19, 20 of the indentation 18 each form a secondary cutting edge, and the base 21 of the indentation 18 forms a second major cutting edge 22 which is offset in the feed direction V behind the first major cutting edge 15, and whereby the cutting insert 3 is formed by at least two separate sections 4a, 4b, each of which carries a part of the indentation 18.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Several exemplary embodiments of the invention are explained in greater detail below and are illustrated in the accompanying drawings, in which.

DESCRIPTION OF THE PREFERRED EMBODIMENT

Identical parts or parts that perform the same function are identified by the same reference numbers in all the figures.

Figure 1:
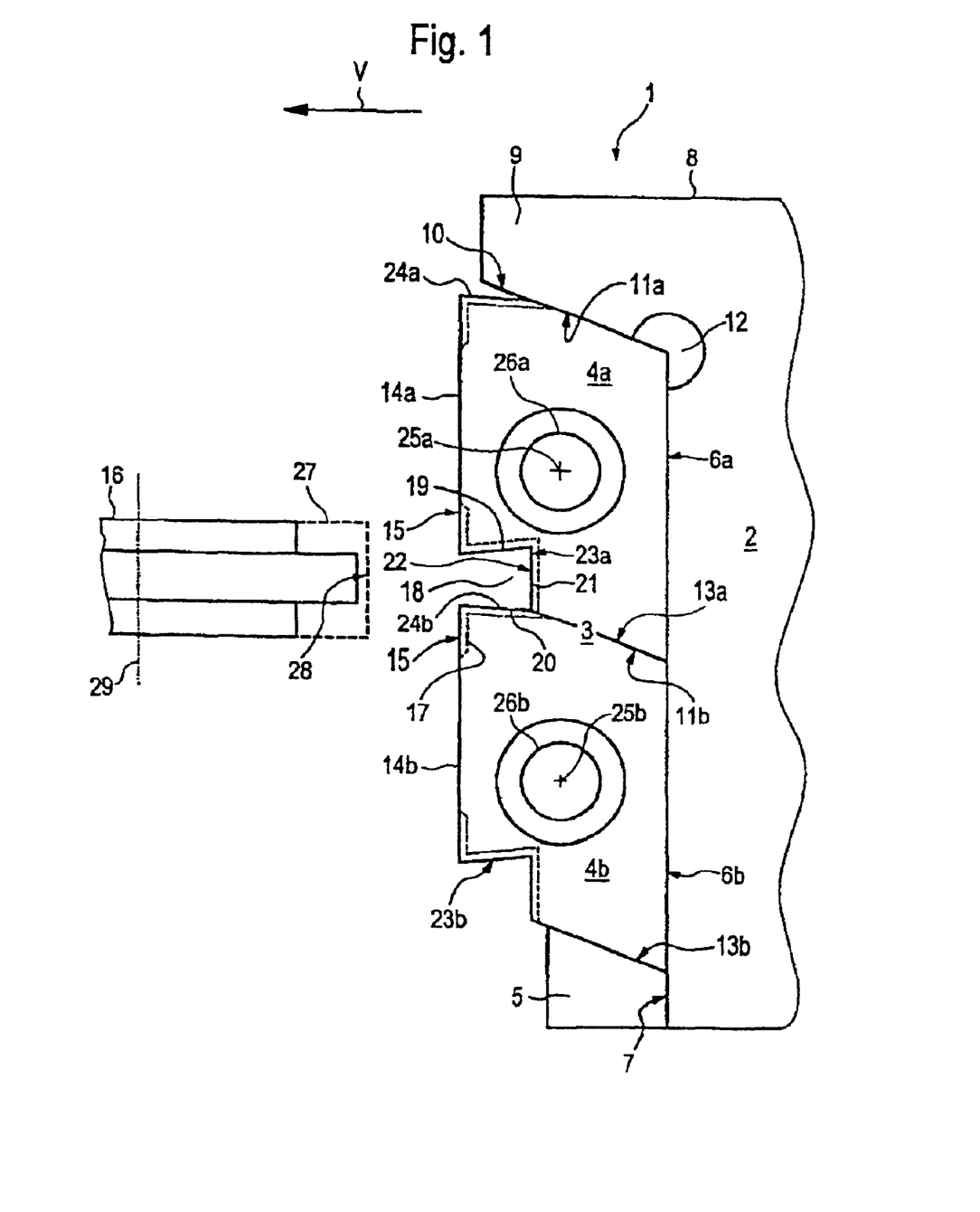
FIG. 1 is an overhead view of a cutting tool with a tool holder and a cutting insert that is realized in two sections, as well as of a workpiece, in particular a piston ring, that has been machined.

The cutting tool 1 illustrated in FIG. 1 comprises a tool holder 2 and a cutting insert 3 mounted in it. The cutting insert 3 consists of two identical sections 4a, 4b, each of which has a base surface in the shape of a parallelogram. The sections 4a, 4b lie on a step 5 which has been made in the front side of the tool holder 2, when viewed in the intended feed direction V, so that each section 4a, 4b is in contact with the rear wall 7 of the step 5 by means of a rear edge 6a, 6b that faces the tool holder 2. The rear wall 7 thus forms a rear contact surface for the sections 4a, 4b. The step 5 is delimited toward a transverse end 8 of the tool holder 2 by a retaining lug 9, the inner wall 10 of which forms a lateral stop for the section 4a. The inner wall 10 thereby forms an oblique angle with the rear wall 7, which corresponds to the oblique parallelogram angle of the parallelogram-shaped section 4a. Consequently, one lateral edge 11a of the section 4a is in contact with the inner wall 10. A recess 12 made in the vicinity of the intersecting line between the inner wall 10 and the rear wall 7 in the tool holder 2 improves the contact of the section 4a against the inner wall 10 and the rear wall 7. The lateral edge 13a opposite the lateral edge 11a acts as a contact surface for the adjacent lateral edge 11b of the second section 4b, which is likewise inserted in the step 5, parallel with and at an offset from the first section 4a.

The two facing front edges 14a and 14b of the respective rear edges 6a, 6b of the respective sections 4a and 4b are aligned with each other and together form a first major cutting edge 15 which is oriented approximately perpendicular to the feed direction V, for the cutting of a workpiece 16. The major cutting edge 15 is provided with a ground section or sharpened edge 17 at least in the partial area that comes into contact with the workpiece 16. In the vicinity of the joint between the sections 4a and 4b, the first major cutting edge 15 is interrupted by an indentation 18 which is approximately in the shape of a rectangular letter "U". The indentation 18 comprises two lateral legs 19 and 20 which are angled from the first major cutting edge 15 at an acute angle which is slightly less than 90° opposite to the feed direction V, and are ground or sharpened to form secondary cutting edges. The indentation 18 further comprises a base 21 which is parallel to the first major cutting edge 15 and connects the two lateral legs 19 and 20, which base 21 forms a second major cutting edge 22 which is recessed with respect to the first major cutting edge 15 in the feed direction V and is also ground or sharpened for this purpose.

The indentation 18 is located with respect to the section 4a and 4b so that the section 4a carries the side leg 19 and the base 21, while the section 4b carries the second side leg 20. In other words, the separating line between the two sections 4a and 4b runs so that it intersects the indentation 18 exactly at the transition between the side leg 20 and the base 21. Considered all by itself, the section 4a is provided in the corner area that is formed between the lateral edge 13a and the front edge 14a with an acute-angle notch 23a, the ground or sharpened legs of which form the side leg 19 and the base 21. On the other hand, the section 4b has, on its lateral edge 11b, a ground or sharpened notch 24b that is angled at an oblique angle from the lateral edge 11b that forms the side leg 20.

Because the sections 4a and 4b are identical, the section 4a is also provided with a corresponding notch 24a on its lateral edge 11a. Likewise, the section 4b has an acute-angle notch 23b on its lateral edge 13b. If the sections 4a and 4b are interchanged, e.g. after the cutting edges located in the vicinity of the notch 23a and the notch 24b become worn, the cutting insert illustrated in FIG. 1 is reproduced identically. However, the indentation 18 would thereby be formed by the notch 23b and the notch 24a. The sections 4a and 4b can therefore be reused according to the principle of a disposable insert. It is likewise possible, in a manner not described in any further detail, to attach additional sections that are identical to the sections 4a and 4b to the section 4b, so that a plurality of indentations identical to the indentation 18 would be located next to one another.

To fasten the sections 4a and 4b to the tool holder 2, each section 4a, 4b is provided with a boring 26a, 26b that is centered with respect to the surface midpoint 25a, 25b of the respective parallelogram-shaped section 4a, 4b, by means of which the section 4a, 4b can be screwed to the tool holder 2 in a manner that is not described here in any further detail.

To machine the workpiece 16, which before processing is the untrimmed blank 27 that has an approximately circular ring shape, the cutting tool 1 is advanced in the feed direction V against the periphery 28 of the untrimmed blank 27 that is rotating around the ring axis 29. The stepped contour of the workpiece 16, which is indicated by the solid lines, is thereby produced in a single machining process. The shape of the indentation 18, which widens in the direction opposite to the feed direction V, guarantees the necessary access to the side legs 19 and 20 which act as secondary cutting edges.

Figure 2:
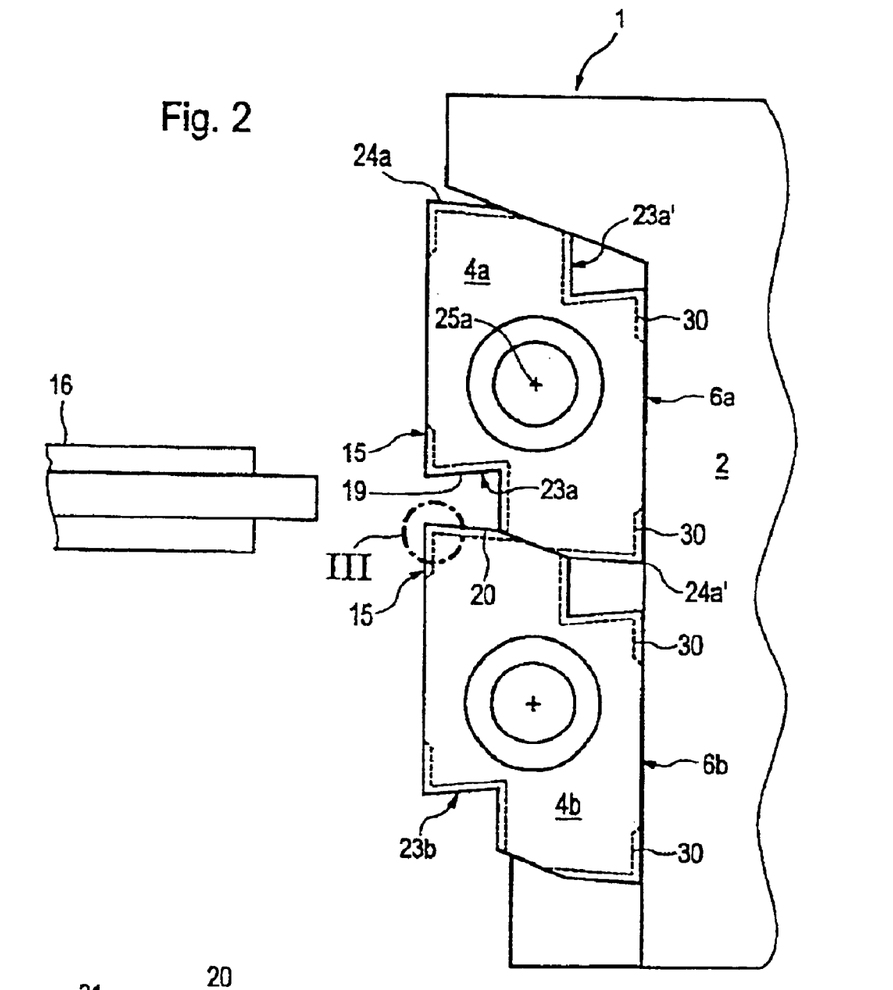
FIG. 2 is a view like the one in FIG. 1 of an alternative realization of the cutting tool.

FIG. 2 shows an alternative realization of the cutting tool 1, which differs from the realization illustrated in FIG. 1 in terms of the shape of the sections 4a and 4b. The again identical sections 4a and 4b are here provided with additional ground or sharpened edges 30 located on the rear edges 6a, 6b. Thus the section 4a is provided with a notch 23a' which is centrically symmetric with the notch 23a with respect to the surface midpoint 25a. Likewise, the section 4a has a notch 24a' which is centrically symmetric with the notch 24a with respect to the surface midpoint 25a. The section 4a is thereby realized so that it is centrically symmetric within itself. The same is true for the section 4b.

As a result of the shape of the sections, an improved utilization of the material of the sections 4a and 4b is achieved, because each section 4a and 4b can be rotated by 180° around the midpoints 25a and 25b of their respective surfaces into a position that is identical to the starting position, and there are thus 4 identical possible combinations of the sections 4a and 4b, each with a different arrangement of the cutting edges in the indentation 18.

Figure 3:
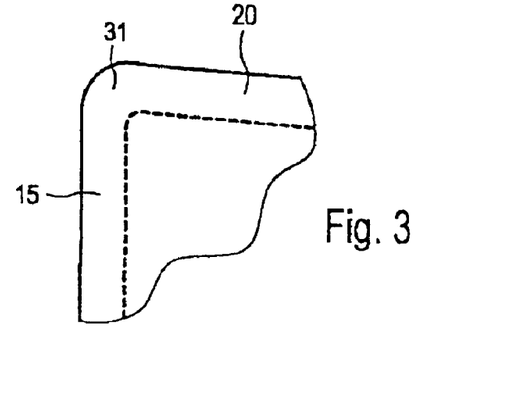
FIG. 3 shows an enlarged detail III of the realization illustrated in FIG. 2.

FIG. 3 is an illustration on a larger scale of a detail of the corner area formed between the first major cutting edge 15 and the side leg 20. This figure shows clearly that the corner area 31 is rounded to prevent the formation of a sharp edge on the finished workpiece 16. There is an identical rounding in the corner area formed between the first major cutting edge 15 and the side leg 19. Instead of a rounded shape, the corner area 31 can also be beveled, i.e. it can have a slanted area that lies at an angle of approximately 45° with respect to the major cutting edge 15.

Figure 4:
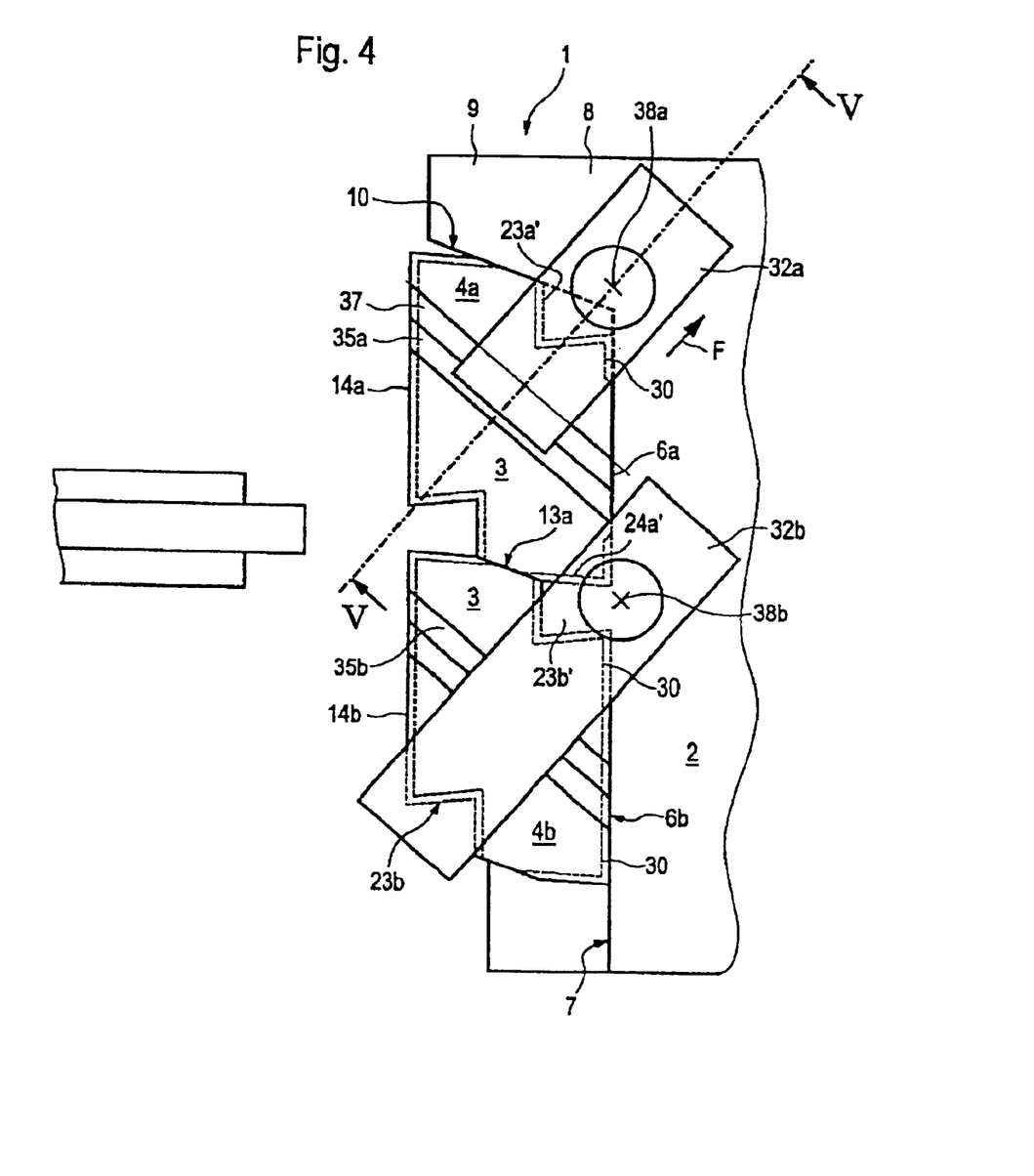
FIG. 4 is a view similar to FIG. 1 of an additional realization of the cutting tool.
Figure 5:
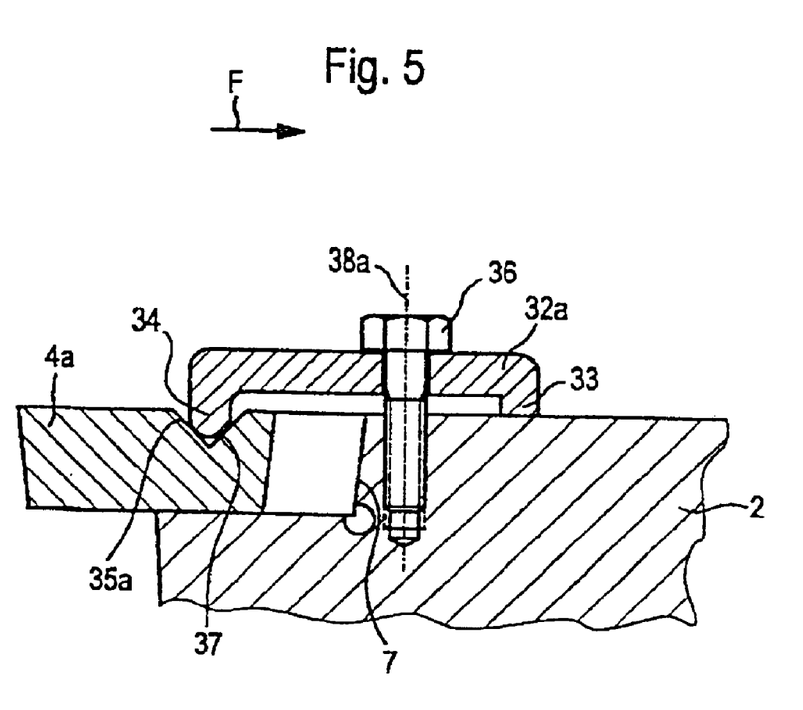
FIG. 5 shows the cutting tool illustrated in FIG. 4 in a cross section along Line V—V.

An additional embodiment of the cutting tool 1 illustrated in FIG. 4 differs from the realization illustrated in FIG. 2 in that, instead of the screw fastening, the sections 4a and 4b are each fixed in position on the tool holder 2 by respective clamping brackets 32a and 32b. Each clamping bracket 32a, 32b, as shown especially clearly in the cross section illustrated in FIG. 5, is supported by a support web 33 on the tool holder 2, and on the other side is engaged with a retaining web 34 in an approximately V-shaped groove 35a, 35b of the corresponding section 4a, 4b. Each clamping bracket 32a, 32b is pressed against the tool holder 2 by means of a screw 36a, 36b, and thereby holds the section 4a, 4b on the tool holder 2. As a result of the contact of the retaining web 34 against the inclined wall 37 of the V-shaped groove 35a, 35b, pressure is applied to the section 4a, 4b not only in the direction of the screw axis 38, but also perpendicular to it with a force F directed in the longitudinal direction of the clamping bracket 32a, 32b. This arrangement is particularly advantageous if, as shown in FIG. 4, the clamping brackets 32a, 32b are oriented diagonally with respect to the tool holder 2 and are thus at approximately the same angle with respect to the rear wall 7 and to the inner wall 10 or the lateral edge 13a. When the screws 38a, 38b are tightened, the sections 4a and 4b are then pressed by the force F against the corresponding stops and are thereby automatically adjusted to the correct position. The clamping brackets 32a, 32b are also located so that they cover the indentations and notches 23a', 24a', 23b' and 24b that are not being used for cutting, and thus protect them against damage caused by chips.

In the realization of the cutting insert 3 illustrated in FIGS. 4 and 5, the front edges 14a, 14b are also ground or sharpened over their entire length. The same is true for the rear edges 6a, 6b. To ensure contact of the rear edges 6a, 6b against the rear wall 7 over a large area, the rear wall 7 in this realization is inclined at an angle that corresponds to the clearance angle of the ground or sharpened surface.

In addition, in at least one possible embodiment of the present invention, the increasing width of the indentation 18 compensates for thermal expansion of the workpiece 16, preferably a piston ring, during the cutting operation. To further explain, in one possible embodiment of the present invention, the cutting tool or cutting arrangement 1 is first advanced toward the rotating workpiece 16. Initially, the first major cutting edges 15 positioned on either side of the indentation 18 contact the workpiece 16 and cut on either side of the workpiece 16, thus producing a centrally-positioned ring that projects radially about the perimeter of the workpiece 16. This projecting ring enters the indentation 18 as the cutting arrangement 1 is advanced toward the workpiece 16 and the first major cutting edges 15 cut or grind off more material. The projecting ring, due to the heat produced by the friction of the cutting process, begins to expand in width as it moves into the indentation 18. The angled design of the sides or side legs 19, 20 of the indentation 18 are used to compensate for this thermal expansion. As the projecting ring increases in size due to thermal expansion, the width of the indentation 18 is also designed to increase in size to accommodate the expanding projecting ring. In this manner, the projecting ring is essentially prevented from becoming lodged in the indentation 18 during the cutting operation. The amount of expansion would depend on the material being cut, the cutting speed, the size of the piston ring to be cut, etc.

Figure 6:
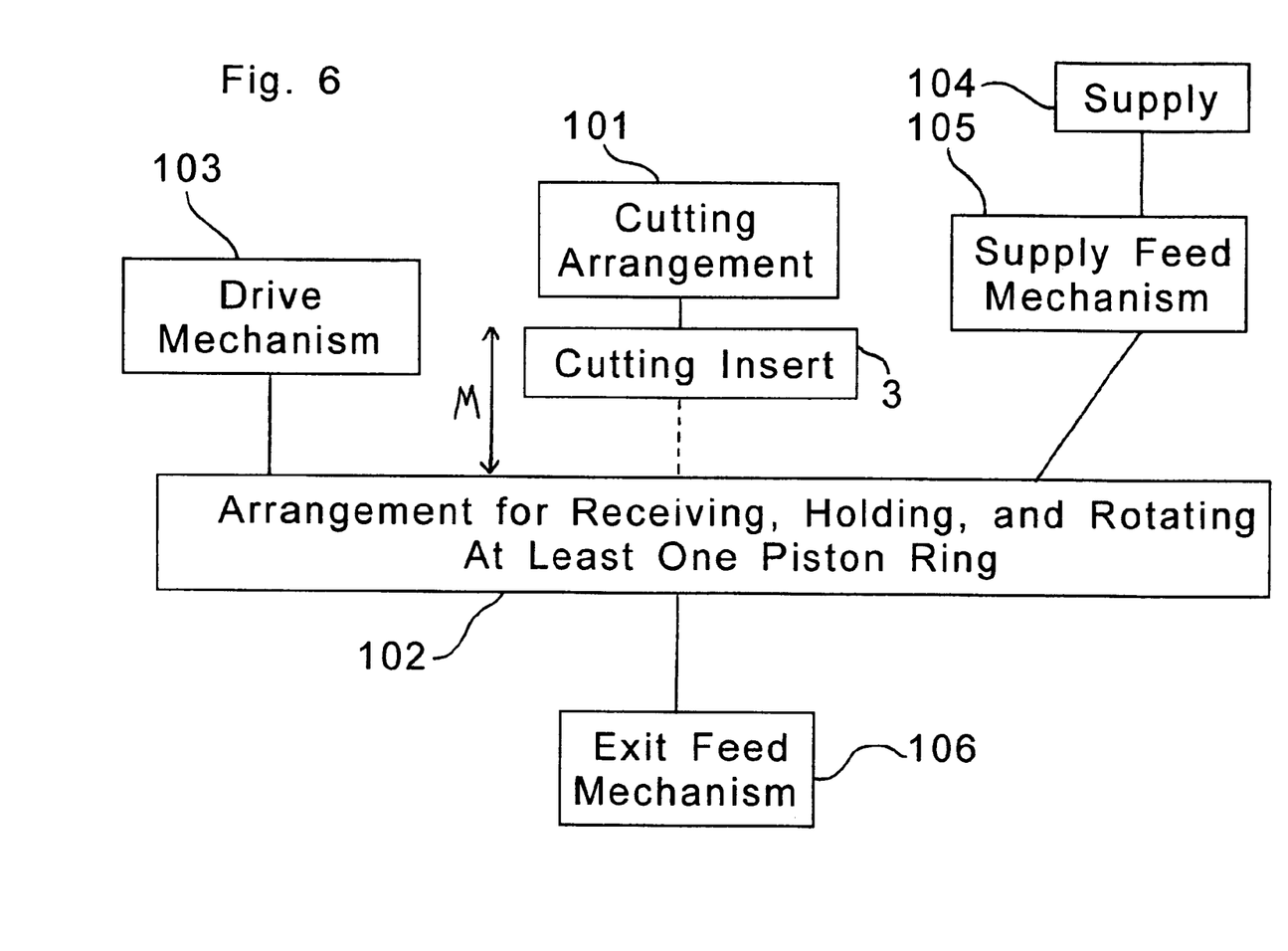
FIG. 6 shows a box diagram of a piston ring machining system according to at least one possible embodiment of the present invention.

According to one possible embodiment of the present invention as shown in the box diagram in FIG. 6, the cutting insert 3 is held or clamped or screwed into a tool holder device 2 connected to a cutting arrangement 101. The cutting insert 3 is designed to be moved toward a workpiece 16 to be cut. The workpiece 16 is preferably a piston ring. The individual workpieces 16 are fed from a supply 104 by a supply feed mechanism 105 to an arrangement 102 for receiving, holding, and rotating the workpieces 16. The holding arrangement 102 is designed to receive and hold individual or multiple workpieces 16. The workpiece 16 is then moved into a position adjacent the cutting arrangement 101. The workpiece 16 is positioned relative to the cutting arrangement 101 such that the major cutting edges 15, 22 are essentially parallel to the center rotational axis 29 of the workpiece 16. At or before the workpiece 16 is in the position adjacent the cutting arrangement 101, a drive mechanism 103 is activated to rotate the holding arrangement 102, and thus the workpiece 16. As the workpiece 16 is rotating, the cutting insert 3 is moved toward the workpiece 16 so the first major cutting edges 15 engage the perimeter surface 28 of the workpiece 16. The cutting insert 3 can be moved toward the workpiece along the path M in FIG. 6, which path runs along a line extending radially from the center axis of the workpiece 16. As described above, the first major cutting edges 15 are separated by an indentation or gap 18. This design permits the first major cutting edges 15 to cut material from two sections of the perimeter 28 of the workpiece 16, while the indentation 18 permits a projecting ring to be formed on the perimeter surface 28 of the workpiece 16. In other words, the first major cutting edges 15 initially cut off material on both sides of the workpiece 16 to form the projecting ring. The cutting insert 3 is then advanced a predetermined distance until the second major cutting edge 22 at the base of the indentation 18 contacts the perimeter surface 28 of the projecting ring and cuts some material from the surface of the projecting ring. To complete the cutting process, the cutting insert 3 is moved back along path M and out of engagement with the workpiece 16, during which movement the side legs or side walls 19,20 of the indentation 18 perform a finishing cut on the sides of the projecting ring. The cutting insert 3 is finally moved to its original starting position away from the completed piston ring. The workpiece holding arrangement 102 then releases the completed piston ring directly into a storage area (not shown) or into an exit feed mechanism 106 to convey the piston ring to a storage area (not shown).

One feature of an embodiment of the invention resides broadly in cutting tool 1 with a cutting insert 3, on the front edge 14 of which there is a first major cutting edge 15 and an approximately U-shaped indentation 18 which interrupts said first major cutting edge 15, whereby the side legs 19, 20 of the indentation 18 each form a secondary cutting edge, and the base 21 of the indentation 18 forms a second major cutting edge 22 which is offset in the feed direction V behind the first major cutting edge 15, and whereby the cutting insert 3 is formed by at least two separate sections 4a, 4b, each of which carries a part of the indentation 18.

Another feature of an embodiment of the invention resides broadly in the cutting tool, characterized by the fact that the first major cutting edge 15 forms an acute angle with the respective adjacent side leg 19, 20.

Yet another feature of an embodiment of the invention resides broadly in the cutting tool, characterized by the fact that the first major cutting edge 15 forms a straight line that is oriented perpendicular to the feed direction V.

Still another feature of an embodiment of the invention resides broadly in the cutting tool, characterized by the fact that the second major cutting edge 22 runs approximately parallel to the first major cutting edge 15.

A further feature of an embodiment of the invention resides broadly in the cutting tool, characterized by the fact that each section 4 has parallel lateral edges 11, 13.

Another feature of an embodiment of the invention resides broadly in the cutting tool, characterized by the fact that the lateral edges 11, 13 are oriented at an acute angle with respect to the feed direction V.

Yet another feature of an embodiment of the invention resides broadly in the cutting tool, characterized by the fact that each section 4 has a rear edge 6 that is approximately perpendicular to the feed direction V.

Still another feature of an embodiment of the invention resides broadly in the cutting tool, characterized by the fact that a first section 4b carries one side leg 20 of the indentation 18, and that a second section 4a carries the base 21 and the other side leg 19 of the indentation 18.

A further feature of an embodiment of the invention resides broadly in the cutting tool, characterized by the fact that the sections 4a, 4b are identical to each other.

Another feature of an embodiment of the invention resides broadly in the cutting tool, characterized by at least one section 4 with a base surface that is centrically symmetrical with respect to its surface midpoint 25.

Yet another feature of an embodiment of the invention resides broadly in the cutting tool, characterized by a tool holder 2 which has a contact surface 5 for the cutting insert 3, a rear stop 7 which interacts with the rear edge 6 of the cutting insert 3 and a lateral stop 10 that interacts with one lateral edge 11a of the cutting insert 3.

Another feature of an embodiment of the invention resides broadly in the cutting tool, characterized by the fact that the cutting insert 3 is held on the tool holder 2 by means of screw fasteners.

Yet another feature of an embodiment of the invention resides broadly in the cutting tool, characterized by the fact that the cutting insert 3 is held on the tool holder by a clamping bracket.

Still another feature of an embodiment of the invention resides broadly in cutting tool, characterized by the fact that the clamping bracket 32 or each of the clamping brackets 32 is realized so that unused cutting edges 23a', 24a', 23b', 23b of the cutting insert 3 are covered by the clamping bracket 32.

The components disclosed in the various publications, disclosed or incorporated by reference herein, may be used in the embodiments of the present invention, as well as equivalents thereof.

The following U.S. Patents are hereby incorporated by reference as if set forth in their entirety herein: U.S. Pat. No. 2,377,960 to Phillips; U.S. Pat. No. 2,566,304 to Bates; U.S. Pat. No. 3,165,011 to Kelly; U.S. Pat. No. 3,630,631 to Becker; U.S. Pat. No. 3,731,562 to Heuser; and U.S. Pat. No. 3,756,099 to Sullivan.

The appended drawings in their entirety, including all dimensions, proportions and/or shapes in at least one embodiment of the invention, are accurate and are hereby included by reference into this specification.

Some examples of milling cutters that may be utilized or adapted for use in at least one possible embodiment of the present invention may be found in the following U.S. Pat. No.: 6,231,281 B1, issued to Nishikawa on May 15, 2001; U.S. Pat. No. 6,220,795 B1, issued to Matthews on Apr. 24, 2001; U.S. Pat. No. 6,217,262 B1, issued to Wright on Apr. 17, 2001; U.S. Pat. No. 6,176,648 B1, issued to Mizutani on Jan. 23, 2001; U.S. Pat. No. 6,158,927, issued to Cole et al. on Dec. 12, 2000; U.S. Pat. No. 6,146,059, issued to Rohr on Nov. 14, 2000; U.S. Pat. No. 6,109,838, issued to Riviere on Aug. 29, 2000; U.S. Pat. No. 6,042,308, issued to Schmitt on Mar. 28, 2000; U.S. Pat. No. 5,967,706, issued to Hughes, Jr. on Oct. 19, 1999; U.S. Pat. No. 5,957,628, issued to Bentjens et al. on Sep. 28, 1999; U.S. Pat. No. 5,934,842, issued to Gupta on Aug. 10, 1999; U.S. Pat. No. 5,919,008, issued to Shimomura on Jul. 6, 1999; U.S. Pat. No. 5,899,642, issued to Berglöw et al. on May 4, 1999; U.S. Pat. No. 5,868,529, issued to Rothballer et al. on Feb. 9, 1999; U.S. Pat. No. 5,848,858, issued to Jager et al. on Dec. 15, 1998; U.S. Pat. No. 5,820,308, issued to Hoefler on Oct. 13, 1998; U.S. Pat. No. 5,762,452, issued to Mina on Jun. 9, 1998; U.S. Pat. No. 5,672,031, issued to Oles on Sep. 30, 1997; U.S. Pat. No. 5,542,795, issued to Mitchell on Aug. 6, 1996; U.S. Pat. No. 5,542,794, issued to Smith et al. on Aug. 6, 1996; U.S. Pat. No. 5,529,439, issued to Werner et al. on Jun. 25, 1996; U.S. Pat. No. 4,990,035, issued to Scheuch et al. on Feb. 5, 1991; U.S. Pat. No. 4,938,638, issued to Hessman et al. on Jul. 3, 1990; U.S. Pat. No. 4,930,949, issued to Giessler on Jun. 5, 1990; U.S. Pat. No. 4,848,978, issued to Keritsis on Jul. 18, 1989; U.S. Pat. No. 4,799,838, issued to Kubo et al. on Jan. 24, 1989; U.S. Pat. No. 4,789,273, issued to Wiacek et al. on Dec. 6, 1988; U.S. Pat. No. 4,729,697, issued to Lacey on Mar. 8, 1988; U.S. Pat. No. 4,728,228, issued to Okunishi et al. on Mar. 1, 1988; U.S. Pat. No. 4,627,771, issued to Kieninger on Dec. 9, 1986; U.S. Pat. No. 4,623,284, issued to Greiff on Nov. 18, 1986; U.S. Pat. No. 4,533,282, issued to Lindlar et al. on Aug. 6, 1985; U.S. Pat. No. 4,519,731, issued to Jester et al. on May 28, 1985; U.S. Pat. No. 4,493,594, issued to Okada on Jan. 15, 1985; U.S. Pat. No. 4,461,602, issued to Zettl on Jul. 24, 1984; U.S. Pat. No. 4,359,299, issued to Sagarian on Nov. 16, 1982; U.S. Pat. No. 4,204,787, issued to McCray et al. on May 27, 1980; U.S. Pat. No. 4,097,174, issued to Heinlein on Jun. 27, 1978; U.S. Pat. No. 4,093,392, issued to Hopkins on Jun. 6, 1978; U.S. Pat. No. 4,061,076, issued to Robertson on Dec. 6, 1977; U.S. Pat. No. 4,050,129, issued to Jester et al. on Sep. 27, 1977; and U.S. Pat. No. 4,050,128, issued to Lange on Sep. 27, 1977.

All, or substantially all, of the components and methods of the various embodiments may be used with at least one embodiment or all of the embodiments, if more than one embodiment is described herein.

The following U.S. Patents and Patent Applications are hereby incorporated by reference as if set forth in their entirety herein: U.S. Pat. No. 6,374,712, issued on Apr. 23, 2002; U.S. Ser. No. 09/966,735, filed Sep. 28, 2001; U.S. Ser. No. 10/008,528, filed Nov. 5, 2001; and U.S. Ser. No. 10/377,588; filed Feb. 28, 2003.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 202 14 238.8, filed on Sep. 13, 2003, having Publication No. 202 16 864 U1 and inventor Walter DORSCH, and DE-OS 202 14 238.8 and DE-PS 202 14 238.8, as well as their published equivalents, and other equivalents or corresponding applications, if any, in corresponding cases in Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of systems for machining piston rings and parts therefor which may possibly be used in at least one possible embodiment of the present invention may possibly be found in the following U.S. Pat. No. 6,230,379, entitled "Combined machining apparatus for making piston rings"; U.S. Pat. No. 6,134,763, entitled "Combined machining apparatus for making piston rings"; U.S. Pat. No. 5,775,978, entitled "Method for the fine machining of piston rings and apparatus for carrying out same"; U.S. Pat. No. 5,259,109, entitled "Machine for the automatic fitting of piston rings onto pistons"; U.S. Pat. No. 5,176,051, entitled "Process for machining radial through-slots in piston-ring grooves"; U.S. Pat. No. 4,950,137, entitled "Radial piston machine having pivoted control means engaging cam ring"; U.S. Pat. No. 4,679,472, entitled "Method and apparatus for machining the circumference of out-of-round workpieces, particularly piston rings"; and U.S. Pat. No. 4,406,192, entitled "Apparatus for machining a planar side face of a piston ring."

The details in the patents, patent applications and publications may be considered to be incorporable, at applicant's option, into the claims during prosecution as further limitations in the claims to patentably distinguish any amended claims from any applied prior art.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

The invention as described hereinabove in the context of the preferred embodiments is not to be taken as limited to all of the provided details thereof, since modifications and variations thereof may be made without departing from the spirit and scope of the invention.

At Least Partial List of Nomenclature
1 Cutting tool
2 Tool holder
3 Cutting insert
4 Section
5 Step
6 Rear edge
7 Rear wall
8 Transverse end
9 Retaining lug
10 Inner wall
11 Lateral edge
14 Front edge
15 Major cutting edge
16 Workpiece
17 Ground or sharpened surface
18 Indentation
19, 20 Side legs
21 Base
22 Major cutting edge
23 Cutout
24 Notch
25 Surface midpoint
26 Boring
27 Untrimmed blank
28 Periphery
29 Ring axis
30 Ground or sharpened surface
31 Corner area
32 Clamping bracket
33 Support web
34 Retaining web
35 Groove
36 Screw
37 Wall
38 Screw Axis
V Feed direction
F Force

What is claimed is:

1. Cutting tool (1) with a cutting insert (3), on the front edge (14) of which there is a first major cutting edge (15) and an approximately U-shaped indentation (18) which interrupts said first major cutting edge (15), whereby the side legs (19, 20) of the indentation (18) each form a secondary cutting edge, and the base (21) of the indentation (18) forms a second major cutting edge (22) which is offset in the feed direction (V) behind the first major cutting edge 15, and whereby the cutting insert (3) is formed by at least two separate sections (4a, 4b), each of which carries a part of the indentation (18).

2. Cutting tool as claimed in claim 1, characterized by the fact that the first major cutting edge (15) forms an acute angle with the respective adjacent side leg (19, 20).

3. Cutting tool as claimed in claim 2, characterized by the fact that the first major cutting edge (15) forms a straight line that is oriented perpendicular to the feed direction (V).

4. Cutting tool as claimed in claim 3, characterized by the fact that the second major cutting edge (22) runs approximately parallel to the first major cutting edge (15).

5. Cutting tool as claimed in claim 4, characterized by the fact that each section (4) has parallel lateral edges (11, 13).

6. Cutting tool as claimed in claim 5, characterized by the fact that the lateral edges (11, 13) are oriented at an acute angle with respect to the feed direction (V).

7. Cutting tool as claimed in claim 6, characterized by the fact that each section (4) has a rear edge (6) that is approximately perpendicular to the feed direction (V).

8. Cutting tool as claimed in claim 7, characterized by the fact that a first section (4b) carries one side leg (20) of the indentation (18), and that a second section (4a) carries the base (21) and the other side leg (19) of the indentation (18).

9. Cutting tool as claimed in claim 8, characterized by the fact that the sections (4a, 4b) are identical to each other.

10. Cutting tool as claimed in claim 9, characterized by at least one section (4) with a base surface that is centrically symmetrical with respect to its surface midpoint (25).

11. Cutting tool as claimed in claim 10, characterized by a tool holder (2) which has a contact surface (5) for the cutting insert (3), a rear stop (7) which interacts with the rear edge (6) of the cutting insert (3) and a lateral stop (10) that interacts with one lateral edge (11a) of the cutting insert (3).

12. Cutting tool as claimed in claim 11, characterized by the fact that the cutting insert (3) is held on the tool holder (2) by means of screw fasteners.

13. Cutting tool as claimed in claim 11, characterized by the fact that the cutting insert (3) is held on the tool holder by a clamping bracket.

14. Cutting tool as claimed in claim 13, characterized by the fact that the clamping bracket (32) or each of the clamping brackets (32) is realized so that unused cutting edges (23a', 24a', 23b', 23b) of the cutting insert (3) are covered by the clamping bracket (32).

15. A method of machining a piston ring from an uncut workpiece using a cutting arrangement, said cutting arrangement comprising a cutting insert, said cutting insert comprising two first major cutting edges separated by an indentation, said cutting insert comprising a second major cutting edge disposed at the bottom of said indentation and substantially parallel to said first major cutting edges, said cutting insert comprising two secondary cutting edges disposed opposite one another on the sides of said indentation to connect said first and second major cutting edges, said two secondary cutting edges being disposed to form an acute angle with said second major cutting edge, said method comprising the steps of:

supplying said workpiece via a supply feed mechanism from a supply to a holding arrangement for receiving, holding, and rotating said workpiece;

holding said workpiece in said holding arrangement;

positioning said workpiece adjacent said cutting arrangement such that a central rotational axis of said workpiece is essentially parallel to said first major cutting edges;

activating a drive mechanism to rotate said holding arrangement;

advancing said cutting insert toward said workpiece;

cutting with said first major cutting edges on both sides of said workpiece to remove material from both sides of said workpiece to produce a projecting ring on the perimeter of said workpiece to machine said workpiece into said piston ring;

continuing advancing said cutting insert further toward said workpiece until the perimeter of said projecting ring contacts and is cut by said second major cutting edge;

moving said cutting insert away from said workpiece to substantially simultaneously perform a finishing cut with said secondary cutting edges to finish machining said workpiece into said piston ring;

moving said cutting insert away from and out of engagement with said piston ring; and transporting said finished piston ring via an exit feed mechanism to a storage area.

16. A cutting tool for machining a piston ring from a workpiece, said cutting tool comprising:

a cutting arrangement being configured to engage and cut a work piece;

a holding arrangement being configured and disposed to hold said cutting arrangement;

said cutting arrangement comprising a first cutting insert and a second cutting insert disposed adjacent and to be in contact with said first cutting insert;

said first cutting insert comprising a first cutting region;

said first cutting region comprising:

a first major cutting edge;

a second major cutting edge being disposed substantially parallel to said first major cutting edge;

said second major cutting edge being disposed offset a distance from said first major cutting edge to permit said first major cutting edge to first engage and cut a workpiece upon cutting; and a secondary cutting edge being disposed transverse to and to connect said first major cutting edge and said second major cutting edge;

said second cutting insert comprising a second cutting region;

said second cutting region comprising:

a first major cutting edge; and a secondary cutting edge being disposed transverse to said first major cutting edge of said second cutting region;

said secondary cutting edge and said second major cutting edge of said first cutting insert being configured and disposed adjacent said lateral edge of said second cutting insert to form an approximately U-shaped indentation disposed between said first major cutting edges of said first cutting insert and said second cutting insert.

* * * * *